United States Patent
Park et al.

(10) Patent No.: US 9,185,699 B2
(45) Date of Patent: *Nov. 10, 2015

(54) METHOD AND APPARATUS FOR WIRELESS RESOURCE ALLOCATION FOR RELAY IN WIRELESS COMMUNICATION SYSTEM

(71) Applicant: LG ELECTRONICS INC., Seoul (KR)

(72) Inventors: Kyu Jin Park, Anyang-si (KR); Sung Ho Moon, Anyang-si (KR); So Yeon Kim, Anyang-si (KR); Jae Hoon Chung, Anyang-si (KR); Min Seok Noh, Anyang-si (KR); Yeong Hyeon Kwon, Anyang-si (KR); Hyun Soo Ko, Anyang-si (KR); Seung Hee Han, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

This patent is subject to a terminal disclaimer.

(21) Appl. No.: 13/925,633

(22) Filed: Jun. 24, 2013

(65) Prior Publication Data
US 2013/0336197 A1 Dec. 19, 2013

Related U.S. Application Data

(63) Continuation of application No. 12/809,048, filed as application No. PCT/KR2009/005650 on Oct. 1, 2009, now Pat. No. 8,477,633.

(60) Provisional application No. 61/101,679, filed on Oct. (Continued)

(51) Int. Cl.
*G01R 31/08* (2006.01)
*H04W 72/04* (2009.01)
*H04L 5/00* (2006.01)
*H04W 84/18* (2009.01)

(52) U.S. Cl.
CPC ......... *H04W 72/0446* (2013.01); *H04L 5/0007* (2013.01); *H04L 5/0037* (2013.01); *H04L 5/0053* (2013.01); *H04L 5/0094* (2013.01);
(Continued)

(58) Field of Classification Search
CPC .................................................... H04W 84/18
See application file for complete search history.

(56) References Cited

U.S. PATENT DOCUMENTS

2008/0025254 A1 1/2008 Love et al.
2010/0040001 A1 2/2010 Montojo et al.
(Continued)

OTHER PUBLICATIONS

U.S. Appl. No. 13/388,969, Office Action dated Jan. 31, 2014, 12 pages.

*Primary Examiner* — John Blanton
(74) *Attorney, Agent, or Firm* — Lee, Hong, Degerman, Kang & Waimey

(57) ABSTRACT

According to one embodiment, a method of allocating a radio resource for a relay station includes: transmitting configuration information through a higher layer signal, the configuration information including information regarding an OFDM symbol at which a relay zone begins; allocating the relay zone to the relay station in a subframe based on the configuration information; and transmitting a relay control channel to the relay station in the relay zone. The subframe includes OFDM symbols in a time domain and subcarriers in a frequency domain. The relay zone includes a subset of the OFDM symbols in the time domain and a portion of the subcarriers in the frequency domain. The configuration information indicates an OFDM symbol from among a second OFDM symbol, a third OFDM symbol and a fourth OFDM symbol. The relay control channel is transmitted from the fourth OFDM symbol of the subframe.

14 Claims, 22 Drawing Sheets

Related U.S. Application Data 1, 2008, provisional application No. 61/113,210, filed on Nov. 10, 2008, provisional application No. 61/121,531, filed on Dec. 10, 2008, provisional application No. 61/155,127, filed on Feb. 24, 2009, provisional application No. 61/157,168, filed on Mar. 3, 2009, provisional application No. 61/231,028, filed on Aug. 4, 2009, provisional application No. 61/232,774, filed on Aug. 10, 2009.

(52) U.S. Cl.
CPC ............ *H04W 72/04* (2013.01); *H04W 72/044* (2013.01); *H04W 84/18* (2013.01)

(56) References Cited

U.S. PATENT DOCUMENTS

2010/0110942 A1   5/2010   Cai et al.
2010/0254301 A1   10/2010  Blankenship et al.

METHOD AND APPARATUS FOR WIRELESS RESOURCE ALLOCATION FOR RELAY IN WIRELESS COMMUNICATION SYSTEM

CROSS-REFERENCE TO RELATED APPLICATIONS

This application is a continuation of U.S. application Ser. No. 12/809,048, filed Jun. 17, 2010, now U.S. Pat. No. 8,477, 633, which is the National Stage filing under 35 U.S.C. §371 of International Application No. PCT/KR2009/005650, filed on Oct. 1, 2009, which claims the benefit of U.S. Provisional Application Serial Nos. 61/101,679, filed on Oct. 1, 2008, 61/113,210, filed on Nov. 10, 2008, 61/121,531, filed on Dec. 10, 2008, 61/155,127, filed on Feb. 24, 2009, 61/157,168, filed on Mar. 3, 2009, 61/231,028, filed on Aug. 4, 2009, and 61/232,774, filed on Aug. 10, 2009, the contents of all of which are incorporated by reference herein in their entireties.

TECHNICAL FIELD

The present invention relates to wireless communications, and more particularly, to designing of a subframe structure ensuring backward compatibility in a wireless communication system and communication using the subframe structure.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced.

The LTE-advanced (LTE-A) may include a new technology, e.g., relay, coordinated multiple point transmission/reception (CoMP), etc., and can support an improved technology, e.g., multiple input multiple output (MIMO) extension which uses a more number of transmit antennas than the number of transmit antennas used in the LTE. A relay station is a device for relaying a signal between a base station and a user equipment, and is used for cell coverage extension and throughput enhancement of a wireless communication system.

Backward compatibility with a user equipment, a network, or the like which is designed to operate in the legacy LTE is one of factors to be considered in the LTE-A. That is, the LTE-A preferably supports operations of the user equipment, the network, or the like which is designed to operate in the LTE. From this aspect, designing of a subframe structure, that is, allocation of radio resources in a subframe, is a matter to be considered.

In addition, the relay station decodes a physical downlink control channel (PDCCH) allocated to the relay station by performing blind decoding in a radio resource region allocated in a subframe. Further, the relay station receives data by finding a physical downlink shared channel (PDSCH) allocated to the relay station through the PDCCH. However, it is ineffective to perform blind decoding by the relay station throughout a full frequency band in a frequency domain of a subframe.

Accordingly, there is a need for a subframe structure and a method capable of effectively allocating radio resources to a relay station while providing backward compatibility with a legacy user equipment in a wireless communication system employing the relay station.

DISCLOSURE

Technical Problem

The present invention provides a method and apparatus for allocating radio resources for a subframe, whereby the radio resources can be effectively allocated to a relay station while providing backward compatibility in a wireless communication system employing the relay station.

Technical Solution

According to an aspect of the present invention, a method of allocating a radio resource for a relay station in a wireless communication system is provided. The method includes allocating a relay zone to the relay station in a subframe, and transmitting a relay control channel to the relay station by using the relay zone, wherein the subframe comprises a plurality of orthogonal frequency division multiplexing (OFDM) symbols in a time domain and a plurality of subcarriers in a frequency domain, wherein the subframe is divided into a user zone used by a user equipment in a cell and the relay zone used by the relay station, and wherein the relay zone comprises some of the plurality of subcarriers.

According to another aspect of the present invention, a method of monitoring a control channel of a relay station in a wireless communication system is provided. The method includes detecting the control channel by monitoring the control channel in a subframe, and receiving data of the relay station through a data channel indicated by a radio resource allocation of the control channel detected in the subframe, wherein the subframe is divided into a user zone used by a user equipment in a cell and a relay zone used by the relay station, and wherein the relay station monitors the control channel in the relay zone.

Advantageous Effects

According to the present invention, a subframe structure provides backward compatibility with a legacy wireless communication system. A relay station can effectively find a radio resource allocated to the relay station, thereby decreasing a decoding time.

MODE FOR INVENTION $3^{rd}$ generation partnership project (3GPP) long term evolution (LTE) is a part of evolved-universal mobile telecommunications system (E-UMTS). The 3GPP LTE employs orthogonal frequency division multiple access (OFDMA) in a downlink and employs single carrier-frequency division multiple access (SC-FDMA) in an uplink. LTE-advanced (LTE-A) is an evolution of LTE. An LTE system is a system based on 3GPP TS release 8. An LTE-A system has backward compatibility with the LTE system.

For clarity of explanation, the following description will focus on 3GPP LTE/LTE-A. However, the technical features of the present invention are not limited thereto. Hereinafter, an LTE user equipment (UE) is a UE supporting LTE, and an LTE-A UE is a UE supporting LTE and/or LTE-A. However, this is for exemplary purposes only, and thus the LTE UE may be a first UE supporting a first radio access technology (RAT), and the LTE-A UE may be a second UE supporting not only the first RAT but also a second RAT providing backward compatibility with the first RAT.

Figure 1:
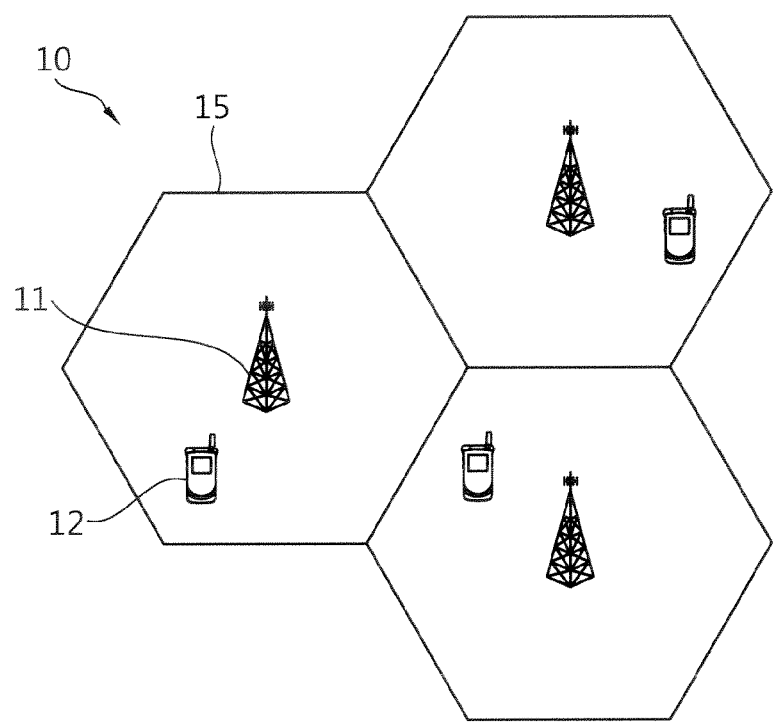
FIG. 1 shows a wireless communication system.

FIG. 1 shows a wireless communication system.

Referring to FIG. 1, a wireless communication system 10 includes at least one base station (BS) 11. Each BS 11 provides a communication service to a specific geographical region 15 generally referred to as a cell. The cell can be divided into a plurality of regions, and each region can be referred to as a sector. The BS 11 is generally a fixed station that communicates with a user equipment (UE) 12 and may be referred to as another terminology, such as an evolved node-B (eNB), a base transceiver system (BTS), an access point, etc. The BS 11 can perform functions such as connectivity with the UE 12, management, control, resource allocation, etc.

The UE 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. Hereinafter, a downlink (DL) implies communication from the BS 11 to the UE 12, and an uplink (UL) implies communication from the UE 12 to the BS 11.

Figure 2:
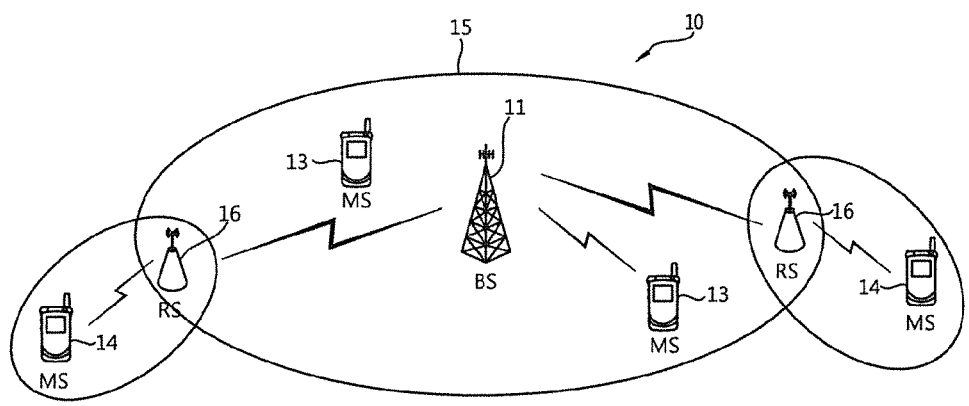
FIG. 2 shows a wireless communication system employing a relay station.

FIG. 2 shows a wireless communication system employing a relay station. A relay station (RS) 16 is a device for relaying a signal between a BS 11 and an MS 14, and is also referred to as another terminology such as a relay node (RN), a repeater, a relay, etc.

An MS can be classified into a macro UE (or simply Ma_UE) 13 and a relay UE (or simply Re_UE) 14. The Ma_UE 13 denotes a UE which directly communicates with the BS 11. The Re_UE 14 denotes a UE which communicates with the RS. Even if the Ma_UE 13 is located in a cell of the BS 11, the Ma_UE 13 can communicate with the BS 11 via the RS 16 to improve a transfer rate based on a diversity effect. The Ma_UE 13 and/or the Re_UE 14 may include an LTE UE or an LTE-A UE.

Hereinafter, a backhaul link denotes a link between the BS 11 and the RS 16. A backhaul downlink denotes communication from the BS 11 to the RS 16. A backhaul uplink denotes communication from the RS 16 to the BS 11. An access link denotes a link between the RS 16 and the Re_UE 14. An access downlink denotes communication from the RS 16 to the Re_UE 14. An access uplink denotes communication from the Re_UE 14 to the RS 16.

Figure 3:
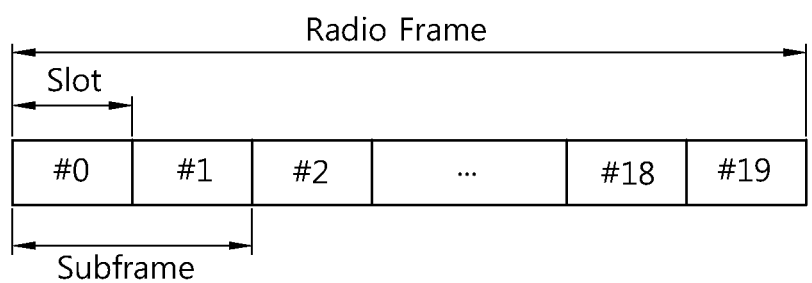
FIG. 3 shows a frequency division duplex (FDD) radio frame structure of a $3^{rd}$ generation partnership project (3GPP) long term evolution (LTE) system.

FIG. 3 shows a frequency division duplex (FDD) radio frame structure of a 3GPP LET system. The sector 4.1 of 3GPP TS 36.211 (V8.4.0)"Technical Specification; Evolved Universal Terrestrial Radio Access (E-UTRA); Physical Channels and Modulation (Release 8)" may be incorporated herein by reference. When in an FDD mode, DL transmission and UL transmission are divided in a frequency domain.

Referring to FIG. 3, a radio frame consists of 10 subframes, and one subframe consists of two slots. For example, one subframe may have a length of 1 millisecond (ms), and one slot may have a length of 0.5 ms. The slot may consist of 7 orthogonal frequency division multiplexing (OFDM) symbols in case of a normal cyclic prefix (CP), and may consist of 6 OFDM symbols in case of an extended CP. Therefore, a normal subframe having the normal CP may include 14 OFDM symbols, and an extended subframe having the extended CP may have 12 OFDM symbols.

Figure 4:
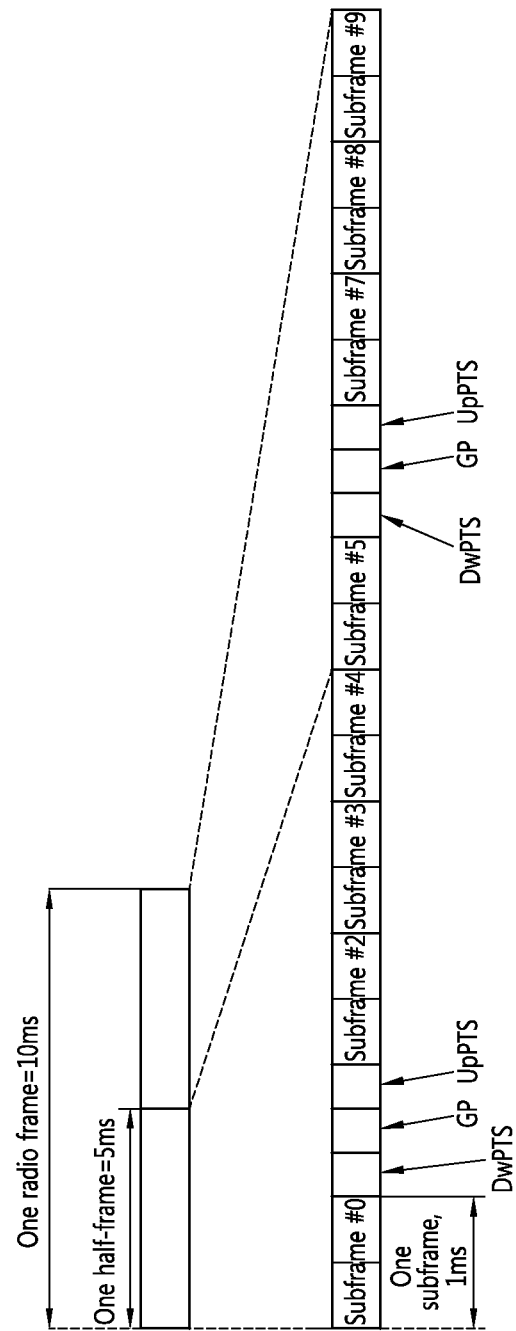
FIG. 4 shows a time division duplex (TDD) radio frame structure of a 3GPP LET system.

FIG. 4 shows a time division duplex (TDD) radio frame structure of a 3GPP LTE system. The section 4.2 of 3GPP TS 36.211 (V8.4.0) may be incorporated herein by reference.

Referring to FIG. 4, a radio frame consists of two half-frames. The half-frame consists of five subframes.

A UL and a DL are identified in a subframe unit. A UL subframe and a DL subframe are separated by a switching point. The switching point is a region for separating the UL and the DL between the UL subframe and the DL subframe. The radio frame has at least one switching point. The switching point includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and for UL transmission synchronization of a UE. The GP is a guarding duration for removing interference generated in the UL due to a multi-path delay of a DL signal between the UL and the DL.

The radio frame structure of FIG. 3 and FIG. 4 is for exemplary purposes only, and thus the number of subframes included in the radio frame or the number of slots included in the subframe may change variously.

Figure 5:
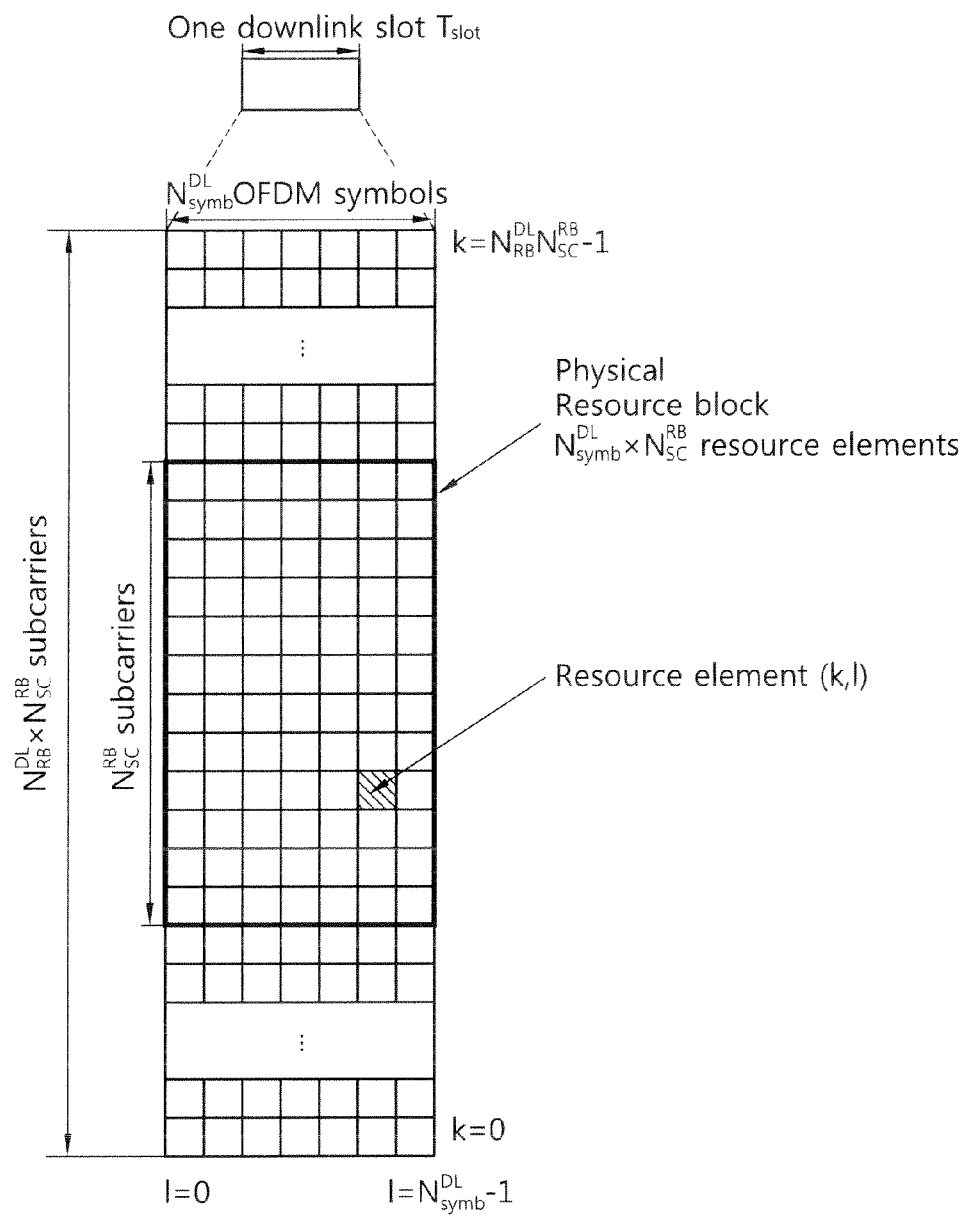
FIG. 5 shows an example of a resource grid for one slot.

FIG. 5 shows an example of a resource grid for one slot.

Referring to FIG. 5, a slot (e.g., a DL slot included in a DL subframe) includes a plurality of OFDM symbols in a time domain. It is described herein that one DL slot includes 7 OFDMA symbols and one resource block includes 12 subcarriers in a frequency domain for exemplary purposes only, and the present invention is not limited thereto.

Each element on the resource grid is referred to as a resource element, and one resource block (RB) includes 12×7 resource elements. The number $N^{DL}$ of resource blocks included in the DL slot depends on a DL transmission bandwidth determined in a cell.

In the 3GPP LTE, the resource block is classified into a physical resource block (PRB) and a virtual resource block (VRB). The PRB includes $N^{DL}_{symb}$ OFDM symbols in the time domain and $N^{RB}_{sc}$ subcarriers in the frequency domain. $N^{DL}_{symb}$ denotes the number of OFDM symbols included in one slot, and $N^{RB}_{sc}$ denotes the number of subcarriers included in one resource block. The PRB is indexed from 0 to $(N^{DL}_{RB}-1)$ in the frequency domain. $N^{DL}_{RB}$ denotes a total number of resource blocks depending on a DL bandwidth. In the frequency domain, a VRB index $n_{PRB}$ is related with a resource element (k,l) as expressed by the following equation.

$$n_{PRB} = \left\lfloor \frac{k}{N^{RB}_{sc}} \right\rfloor \quad \text{[Equation 1]}$$

The VRB has the same size as the PRB, and is classified into a localized type and a distributed type. The localized-type VRB is directly mapped to the PRB so that a VRB $n_{VRB}$ corresponds to a PRB $n_{PRB}$.

The distributed-type VRB is mapped to the PRB in the following manner. First, a parameter $N_{gap}$ is given by the following table.

TABLE 1

| System BW ($N_{RB}^{DL}$) | Gap ($N_{gap}$) | |
|---|---|---|
| | 1st Gap ($N_{gap,1}$) | 2nd Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

Whether $N_{gap}$ is $N_{gap,1}$ or $N_{gap,2}$ is reported by a BS to a UE as a part of a downlink grant.

The VRB is indexed from 0 to $(N^{DL}_{VRB}-1)$. $N^{DL}_{VRB}$ denotes the number of VRBs, and is determined based on $N_{gap}$. According to a VRB index, the VRB is interleaved again. The sector 6.2.3.2 of 3GPP TS 36.211 (V8.4.0) may be incorporated herein by reference for further details of mapping from the VRB to the PRB.

A resource block denotes a PRB hereinafter unless otherwise specified.

Figure 6:
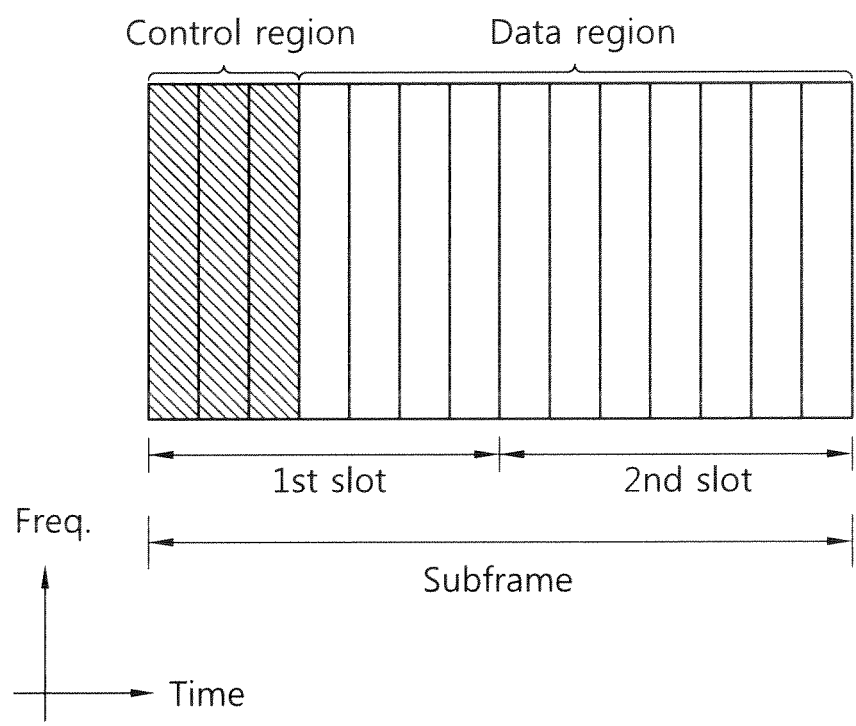
FIG. 6 shows an example of a downlink subframe structure used in 3GPP LTE.

FIG. 6 shows an example of a downlink subframe structure used in 3GPP LTE.

Referring to FIG. 6, a subframe includes two slots. A maximum of three preceding OFDM symbols of a 1st slot in a subframe correspond to a control region to be allocated with control channels. The remaining OFDM symbols correspond to a data region to be allocated with a physical downlink shared channel (PDSCH).

Examples of downlink control channels used in the LTE include a physical control format indicator channel (PCFICH), a physical hybrid-ARQ indicator channel (PHICH), a physical downlink control channel (PDCCH), etc. The PCFICH transmitted in a 1st OFDM symbol of a subframe carries information regarding the number of OFDM symbols (i.e., a size of a control region) used for transmission of control channels in the subframe.

The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH. A PHICH duration denotes the number of OFDM symbols that can be used in PHICH transmission.

The PDCCH can carry a downlink shared channel (DL-SCH)'s resource allocation and transmission format, uplink shared channel (UL-SCH)'s resource allocation information, paging information over a paging channel (PCH), system information on a DL-SCH, a resource allocation of a higher layer control message such as a random access response transmitted over a PDSCH, a transmit power control command for individual UEs included in any UE group, activation of a voice over Internet (VoIP), etc. A plurality of PDCCHs can be transmitted in a control region, and the UE can monitor the plurality of PDCCHs. The PDCCH is transmitted over an aggregation of one or several consecutive control channel elements (CCEs). The CCE is a logical allocation unit used to provide the PDCCH with a coding rate depending on a radio channel condition. The CCE corresponds to a plurality of resource element groups. According to an association relation between the number of CCEs and a coding rate provided by the CCEs, a format of the PDCCH and the number of bits of an available PDCCH are determined. Control information transmitted through the PDCCH is referred to as downlink control information (DCI). The DCI indicates uplink resource allocation information (or referred to as an uplink grant), downlink resource allocation information (or referred to as a downlink grant), an uplink transmit power control command for any UE groups, etc.

The following table shows the DCI according to a DCI format.

TABLE 2

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

A DCI format 0 indicates uplink resource allocation information. DCI formats 1 to 2 indicate downlink resource allocation information. DCI formats 3 and 3A indicate an uplink transmit power control (TPC) command for any UE groups.

The BS determines a PDCCH format according to the DCI to be sent to the UE, and attaches a cyclic redundancy check (CRC) to the DCI. The CRC is masked with a unique identifier (referred to as a radio network temporary identifier (RNTI)) according to an owner or a usage. If a PDCCH is for a specific UE, a unique identifier of the UE, e.g., cell-RNTI (C-RNTI), may be masked to the CRC.

A search space is defined as a space for searching for a PDCCH in a control region. A set of PDCCH candidates to be monitored is defined based on the search space. When an aggregation of all CCEs for the PDCCH is defined as a CCE aggregation in one subframe, the search space is an aggregation of contiguous CCEs beginning at a specific start point in the CCE aggregation according to a CCE aggregation level. The CCE aggregation level is a CCE unit for searching for the PDCCH, and a size thereof is defined by the number of contiguous CCEs. The CCE aggregation level denotes the number of CCEs used for transmission of the PDCCH. The search space is defined according to the CCE aggregation level. A position of each PDCCH candidate differs in the search space according to each CCE aggregation level.

The search space can be classified into a common search space and a UE-specific search space. The common search space is monitored by all UEs within a cell. The UE-specific search space is monitored by a specific UE. A UE monitors the common search space and/or the UE-specific search space according to control information to be received. The number of CCE aggregation levels supported by the common search space is less than the number of CCE aggregation levels supported by the UE-specific search space. The common search space and the UE-specific search space may overlap with each other.

Figure 7:
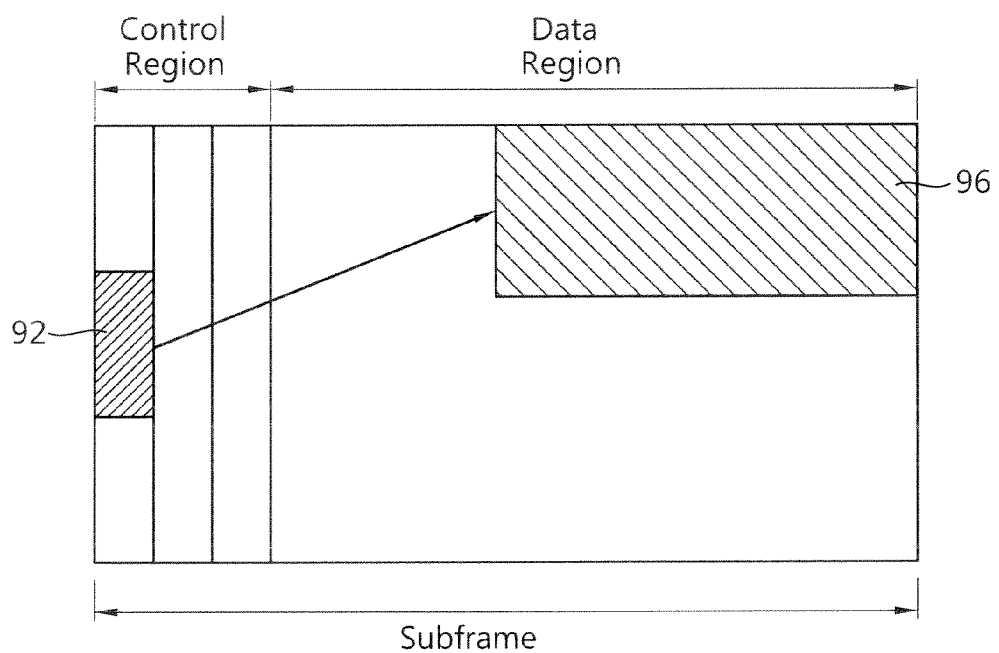
FIG. 7 shows downlink data transmission in 3GPP LTE.

FIG. 7 shows downlink data transmission in 3GPP LTE. A UE receives downlink data over a PDSCH 96 indicated by a PDCCH 92. The UE monitors the PDCCH 92 in a downlink subframe, and receives a downlink resource allocation over the PDCCH 92. The UE receives downlink data over the PDSCH 96 indicated by the downlink resource allocation.

According to Table 2, DCI formats 1, 1A, 1B, 1C, 1D, 2, and 2A are examples of a DCI format including the downlink resource allocation. The UE interprets a resource allocation based on the detected DCI format.

According to the section 7.1.6 of 3GPP TS 36.213 (V8.4.0) incorporated herein by reference, three types of resource allocations are provided based on the DCI format The DCI formats 1, 2, and 2A use a resource allocation type 0 or 1. The DCI format 1A, 1B, 1C, and 1D use a resource allocation type 2. Whether the resource allocation type is 0 or 1 is determined by a resource allocation field included in a PDCCH. Therefore, the DCI formats 1A, 1B, 1C, and 1D using only the resource allocation type 2 do not have the resource allocation field.

The resource allocation type 0 includes a bitmap indicating a resource block group (RBG) allocated to the UE. The RBG is a set of contiguous PRBs. An RBG size P depends on a system bandwidth. A total number $N_{RBG}$ of RBGs is given by $N_{RBG}=N^{DL}_{RB}P$. The resource allocation type 1 indicates an RBG allocated to the UE from a PRB set selected from one of P RBG subsets. That is, the resource allocation type 0 reports an RBG allocated to the UE among from all RBGs as an absolute position value. The resource allocation type 1 divides all RBGs into a plurality of subsets, and reports an RBG allocated to the UE within a subset. The resource allocation type 2 indicates a plurality of contiguous VRBs allocated to the UE. The DCI formats 1A, 1B, 1C, and 1D include a 1-bit flag indicating a localized-type VRB or a distributed-type VRB.

<Relay Zone Allocation Method>

Figure 8:
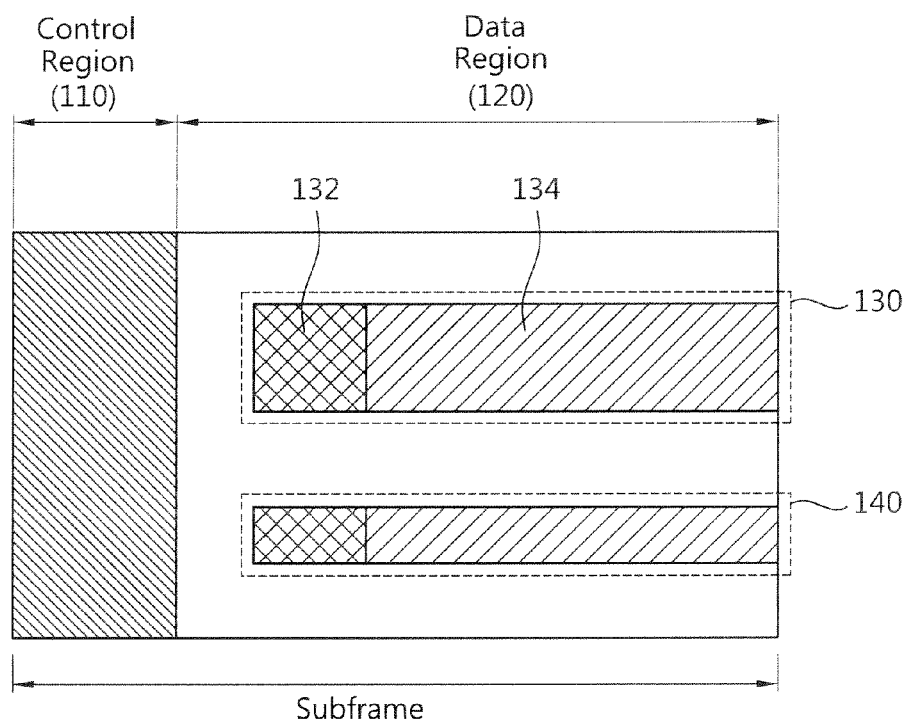
FIG. 8 shows a subframe structure according to an embodiment of the present invention.

FIG. 8 shows a subframe structure according to an embodiment of the present invention.

Referring to FIG. 8, a subframe includes N (e.g., 12 or 14) OFDM symbols in a time domain. The subframe includes a control region 110 and a data region 120 to support a legacy 3GPP LTE UE and/or a legacy 3GPP LTE-A UE. Hereinafter, a macro UE denotes a UE supporting a 3GPP LTE and/or a 3GPP LTE-A which directly receive a service from a BS. In addition, the subframe includes relay zones 130 and 140 to support an RS. That is, the relay zone 130 and 140 are defined as certain regions which are allocated with a radio resource for performing relaying in the existing data region. Although two relay zones 130 and 140 are shown herein for example, the number of relay zones in the subframe is not limited thereto.

The control region 110 may include M preceding OFDM symbols out of N OFDM symbols. The relay zones 130 and 140 may include P OFDM symbols spaced apart fully or partially by one OFDM symbol from the control region 110. Herein, 0<P<(N−M). Therefore, the control region 110 and the relay zones 130 and 140 are divided in the time domain, which is referred to as time division multiplexing (TDM).

The relay zones 130 and 140 may be divided in a frequency domain in a subframe. That is, the first relay zone 130 and the second relay zone 140 occupy different frequencies (or subcarriers). That is, when a subframe includes a plurality of subcarriers in the frequency domain, the relay zones 130 and 140 include OFDM symbols excluding at least one preceding OFDM symbol among N OFDM symbols and include some subcarriers among the plurality of subcarriers. That is, the relay zones 130 and 140 are divided in the frequency domain, which is referred to as frequency division multiplexing (FDM).

The relay zone 130 includes a control relay zone 132 and a data relay zone 134. The control relay zone 132 may include at least one preceding OFDM symbol within the relay zone 130. A size of the control relay zone 132 (i.e., the number of OFDM symbols included in the control relay zone 132) is not limited to any specific value, and thus may be fixed or vary depending on a system. When the size of the control relay zone 132 varies, the size may be reported by using the existing PCFICH, or may be reported by using a part of system information or an additional channel in the relay zone 130.

A control channel for the RS (referred to as an R-PDCCH) may be transmitted in the control relay zone 132. A data channel for the RS (referred to as an R-PDSCH) may be transmitted in the data rely zone 134. The R-PDCCH may carry a backhaul downlink radio allocation for the RS and a backhaul uplink radio allocation for the RS. The R-PDSCH carriers relay data for the RS (also referred to as a transport block, an information bit, or a data packet). The backhaul downlink radio resource allocation in the R-PDCCH indicates an R-PDSCH resource of an RS scheduled in the data relay zone. The RS receives a transport block over the R-PDSCH indicated by the backhaul downlink radio resource allocation received over the R-PDCCH. The RS may receive a control channel allocated to the RS by using a method of monitoring the control relay zone 132 included in the relay zone 130.

The control relay zone 132 and the data rely zone 134 are not included in all relay zones. A certain relay zone may include only a control relay zone, and another relay zone may include only a data relay zone.

A subframe in which the relay zones 130 and 140 are included may be a part of 10 subframes constituting a radio frame. A position of the subframe in which the relay zones 130 and 140 are included may be reported by the BS to the RS by using a part of system information, higher layer signaling, and/or the PDCCH.

Hereinafter, the relay zone is described as a radio resource region used when the BS receives data from the RS. However, the relay zone may be used when the BS transmits data to an LTE-A UE or when the BS receives data from the LTE-A UE. That is, in the subframe, the existing control region and the existing data region are regions providing backward compatibility with an LTE UE, and the relay zone is a region not supporting backward compatibility. The control region and the data region which are used to provide backward compatibility with the LTE UE are referred to as legacy zone or user zone. In the relay zone, the LTE UE may not perform any channel estimation. For clarity of explanation, the relay zone is used dedicatedly by the RS in the following description. However, the present invention can also apply to a case where the relay zone is used dedicatedly by the LTE-A UE or shared by the RS, which is apparent to those skilled in the art.

As described above, in the subframe structure of the legacy 3GPP LTE, a size of the control region 110 is indicated by the PCFICH, and the size may be 1, 2, or 3 OFDM symbols. Hereinafter, allocation of the relay zone will be described in detail according to the size of the control region.

First, a region for transmitting a PDCCH by an RS to a relay UE managed by the RS is necessary in a subframe. Such a region is referred to as an access control region. That is, the RS transmits the PDCCH to the relay UE during a time when a BS transmits the PDCCH to a macro UE in the subframe. In addition, in order for the RS to receive again signal in relay zone after transmitting the PDCCH to the relay UE, physical switching from radio frequency (RF) transmission to RF reception is necessary. A guard time (GT) or a transition time is required to ensure a time for such switching.

Figure 9:
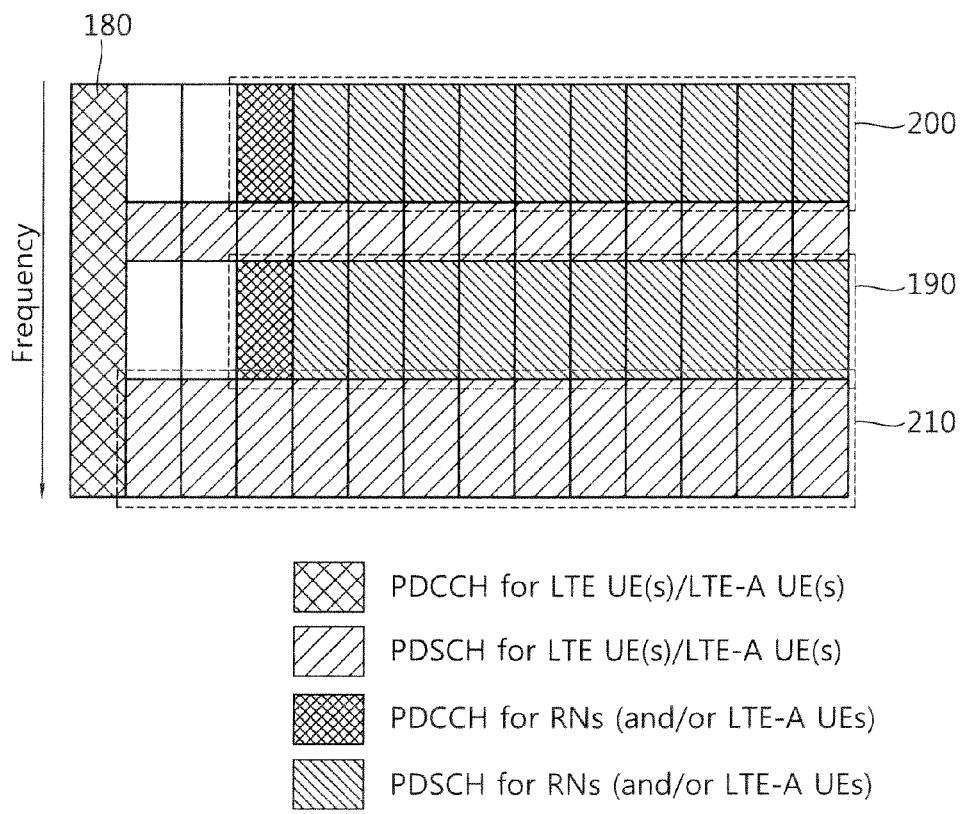
FIG. 9 shows an example of a relay zone in a subframe in which a size of a control region is 1.
Figure 10:
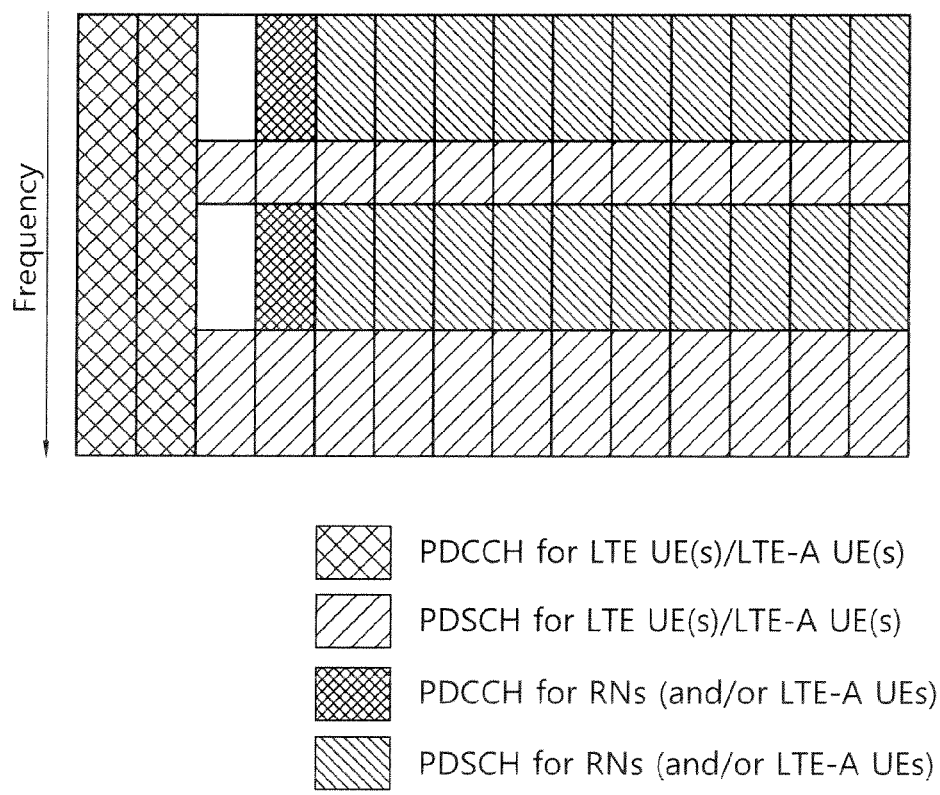
FIG. 10 shows an example of a relay zone in a subframe in which a size of a control region is 2.
Figure 11:
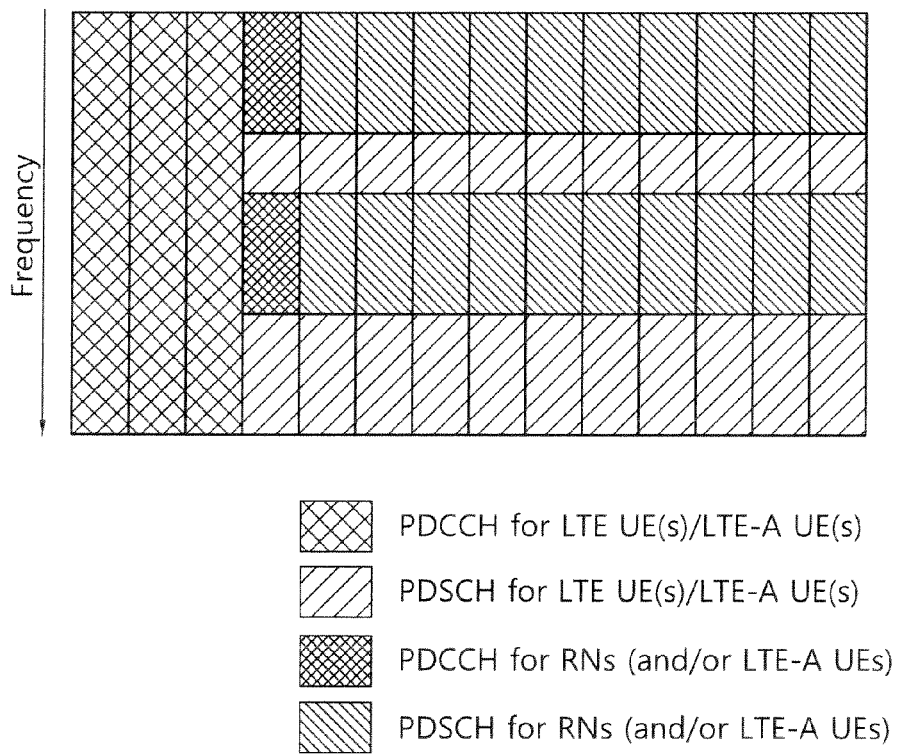
FIG. 11 shows an example of a relay zone in a subframe in which a size of a control region is 3.

First, assume that the access control region corresponds to two preceding OFDM symbols of a subframe, and the GT corresponds to one OFDM symbol. FIG. 9 shows an example of a relay zone in a subframe in which a size of a control region is 1. FIG. 10 shows an example of a relay zone in a subframe in which a size of a control region is 2. FIG. 11 shows an example of a relay zone in a subframe in which a size of a control region is 3. A BS transmits a PDCCH to a macro UE (i.e., an LTE UE and/or an LTE-A UE) in a control region 180. Relay zones 190 and 200 include $4^{th}$ through last OFDM symbols of a subframe. Since a size of the access control region is 2 and the GT occupies one OFDM symbol, the relay zone starts from the $4^{th}$ OFDM symbol in any case.

Figure 12:
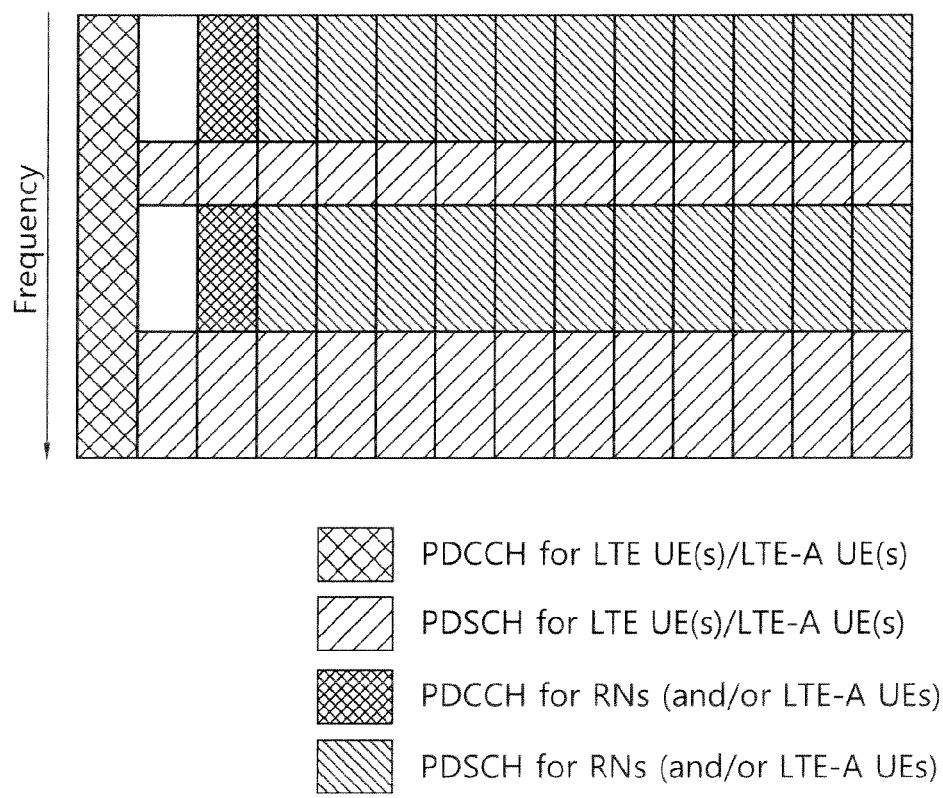
FIG. 12 shows an example of a relay zone in a subframe in which a size of a control region is 1.
Figure 13:
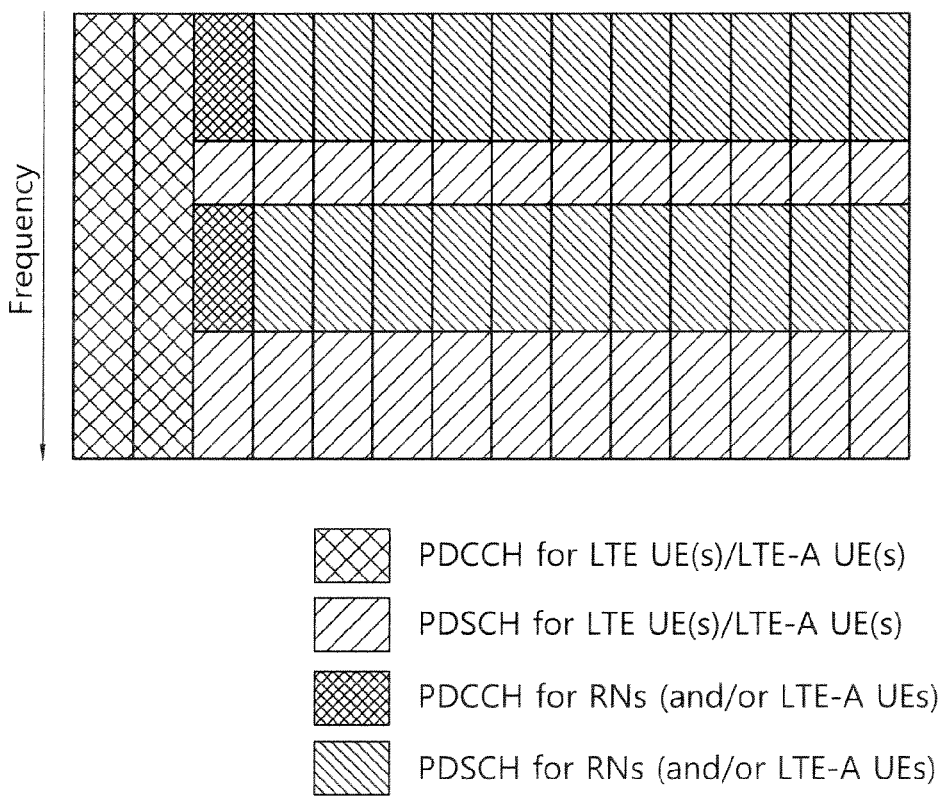
FIG. 13 shows an example of a relay zone in a subframe in which a size of a control region is 2.
Figure 14:
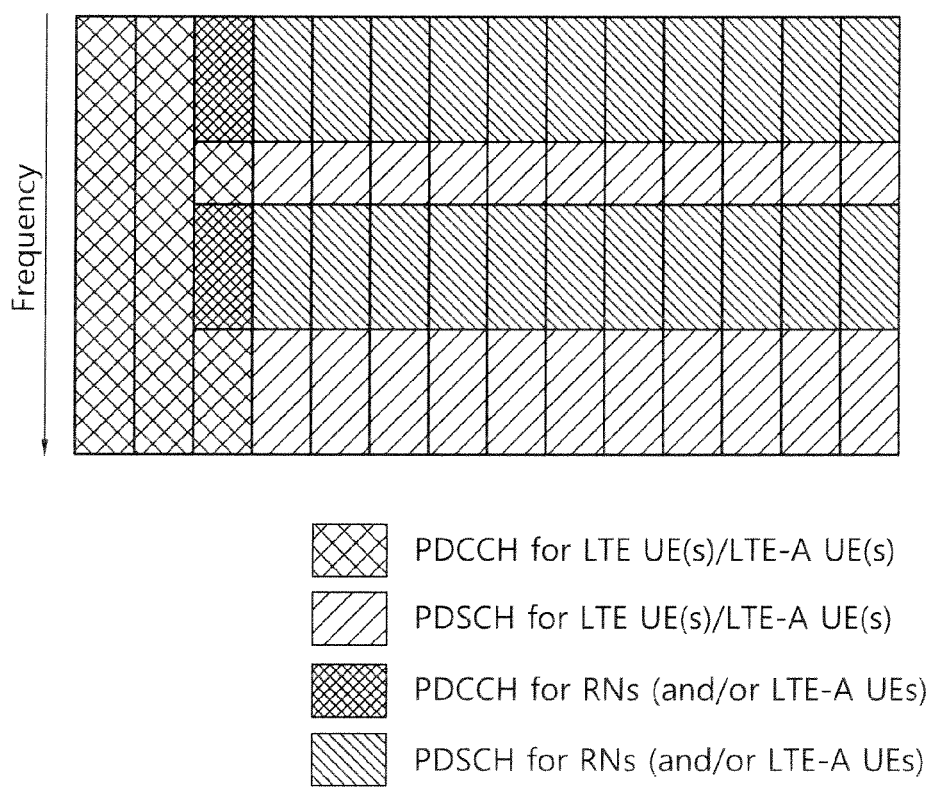
FIG. 14 shows an example of a relay zone in a subframe in which a size of a control region is 3.

Second, assume that the access control region corresponds to one preceding OFDM symbol of a subframe, and the GT corresponds to one OFDM symbol. FIG. 12 shows an example of a relay zone in a subframe in which a size of a control region is 1. FIG. 13 shows an example of a relay zone in a subframe in which a size of a control region is 2. FIG. 14 shows an example of a relay zone in a subframe in which a size of a control region is 3. The relay zone includes $3^{rd}$ through last OFDM symbols of a subframe. Since a size of the access control region is 1 and the GT occupies one OFDM symbol, the relay zone starts from the $3^{rd}$ OFDM symbol in any case.

Figure 15:
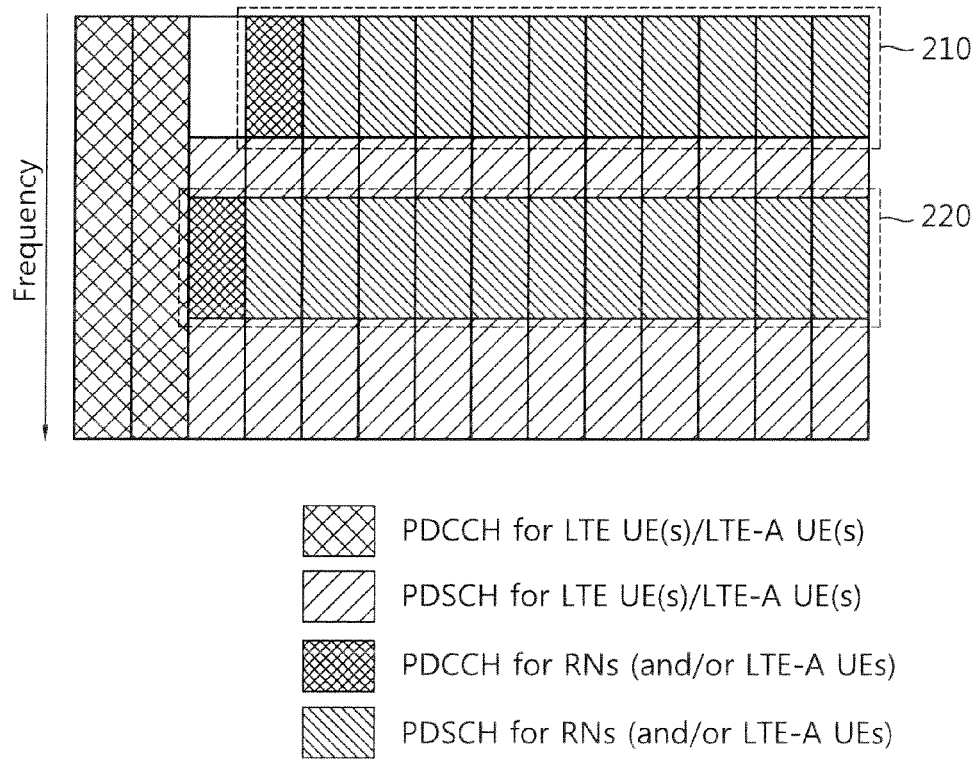
FIG. 15 shows a subframe structure when an access control region has a different size.

Meanwhile, a size or position of the access control region and/or a size of the GT may differ for each RS. FIG. 15 shows a subframe structure when an access control region has a different size. A first relay zone 210 starts from a $4^{th}$ OFDM symbol, and a second relay zone 220 starts from a $3^{rd}$ OFDM symbol. That is, the first relay zone 210 includes an access control region having a size of 2, and is allocated to an RS of which a GT occupies one OFDM symbol. The second relay zone 220 includes an access control region having a size of 1, and is allocated to an RS of which a GT occupies one OFDM symbol. Therefore, the BS can regulate a position or size of a relay zone allocated according to a GT or an access control region supported by the RS.

Although it has been described above that the size of the control relay zone included in the relay zone (i.e., a region for transmitting an R-PDCCH) is one OFDM symbol for example with reference to FIG. 9 to FIG. 15, the present invention is not limited thereto.

Figure 16:
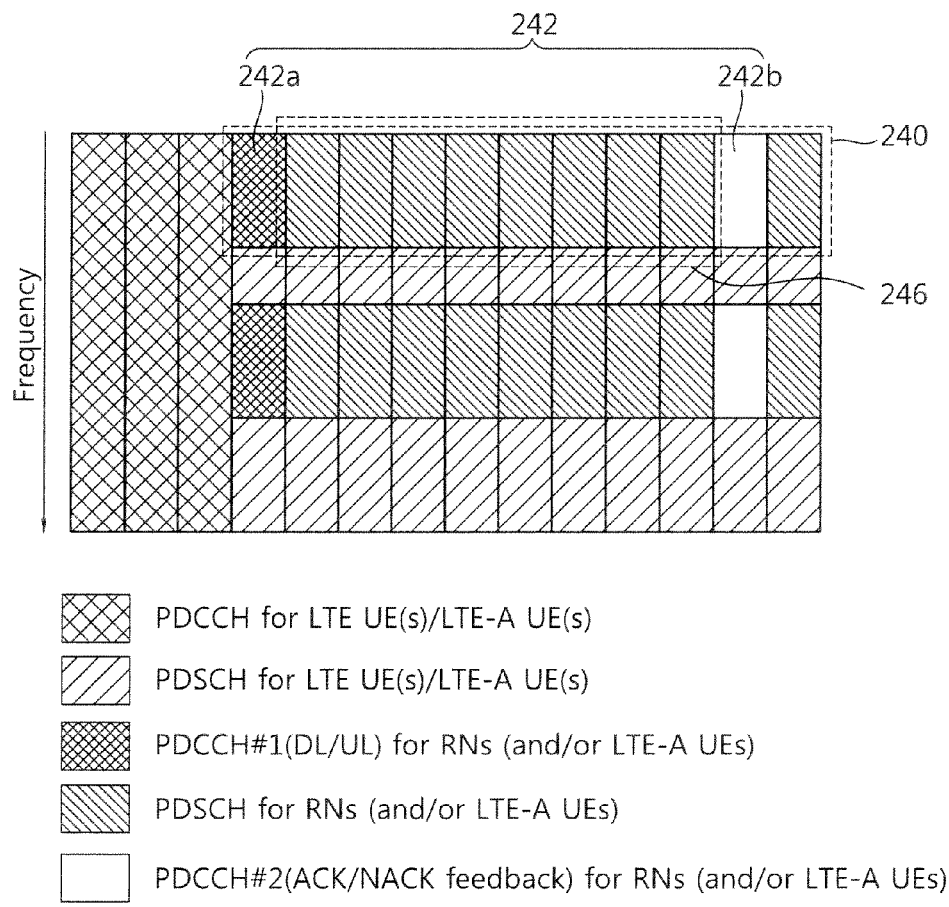
FIG. 16 shows an example of allocating a control relay zone in a relay zone.

FIG. 16 shows an example of allocating a control relay zone in a relay zone. A relay zone 240 includes a control relay zone 242 and a data relay zone 246. The control relay zone 242 includes two separate zones 242a and 242b. The first zone 242a includes a $4^{th}$ OFDM symbol, and the second zone 242b includes a $13^{th}$ OFDM symbol. However, positions or the number of OFDM symbols included in each zone is for exemplary purposes only. The first zone 242a and the second zone 242b may transmit different control channels. The first zone 242a temporally prior to the second zone 242b may transmit a PDCCH and a PCFICH, and the second zone 242b may transmit a PHICH. Alternatively, the first zone 242a may transmit a PDCCH for carrying a backhaul downlink resource allocation, and the second zone 242b may transmit a PDCCH for carrying a back uplink radio allocation.

As shown in FIG. 8 to FIG. 16 above, the relay zone may be configured in various formats. To configure the relay zone, configuration information is required to indicate a start point of the relay zone, a size of the relay zone, a size of the control relay zone, and/or a format of the control relay zone. The configuration of the relay zone may be fixed or may change with a specific period. That is, a format or size of the relay zone may be fixed in each configured subframe or may change with a specific period. Alternatively, relay zone configuration information may be reported by a BS to an RS by using a part of system information, a higher layer message such as a radio resource control (RRC) message, and/or an R-PDCCH. The relay zone configuration information may be piggyback transmitted on a transport block.

Now, backhaul downlink resource allocation over an R-PDCCH will be described. By using the backhaul downlink resource allocation, an RS receives an R-PDSCH. As described above, the 3GPP LTE configures a resource allocation based on a PRB or a VRB.

Figure 17:
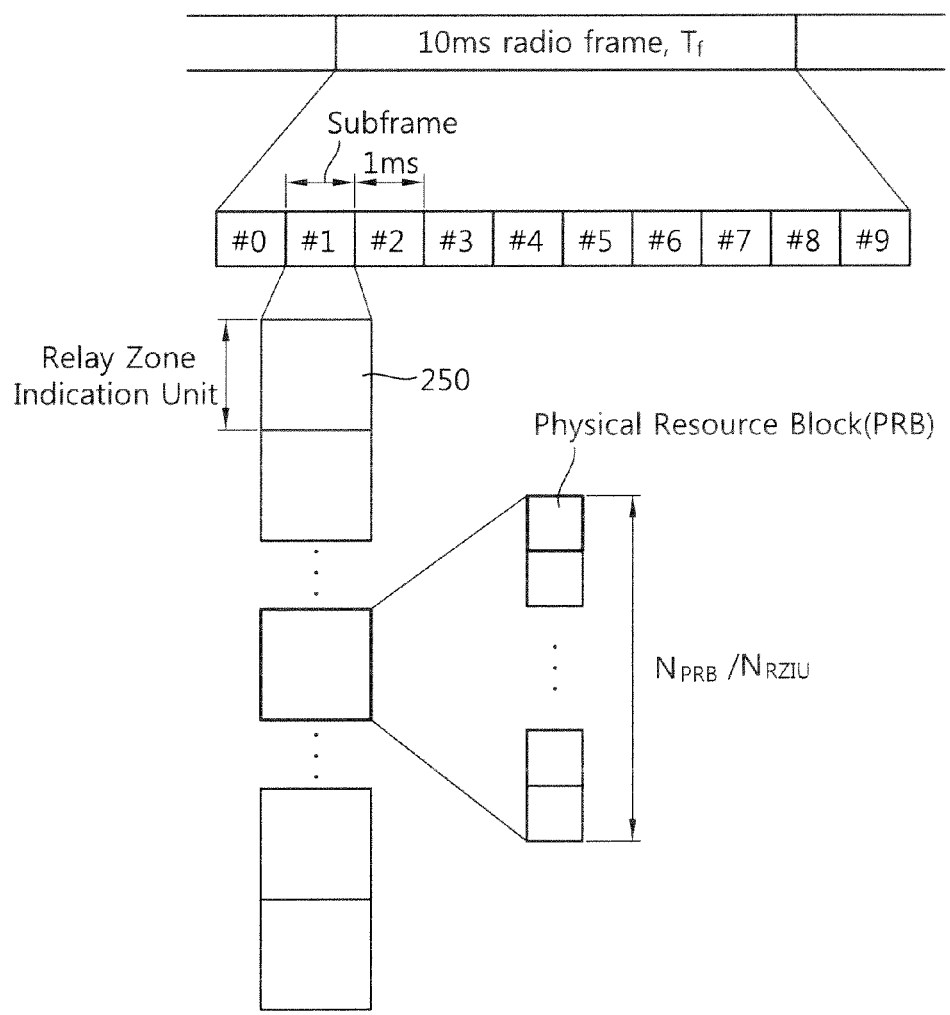
FIG. 17 shows an example of allocating a relay zone.

FIG. 17 shows an example of allocating a relay zone. A relay zone indication unit (RZIU) 250 is a resource allocation unit for indicating allocation of a relay zone, and includes at least one PRB. A size of the RZIU can be expressed by $(N_{PRB}/N_{RZIU})$ in a frequency domain. Herein, $N_{PRB}$ denotes the number of all PRBs included in a frequency band of a subframe, and $N_{RZIU}$ denotes the number of RZIUs included in the frequency band of the subframe. A BS may report $N_{RZIU}$ to an RS.

For relay zone allocation, the BS may report an RZIU allocated in a bitmap format to a scheduled RS. That is, the RZIU is indexed from 0 to $(N_{RZIU}-1)$, and a bitmap of the allocated RZIU is reported by the BS to the RS. Alternatively, the BS may report an index of an RZIU at which the relay zone starts and the number of included RZIUs and thus report the relay zone allocation to the scheduled RS. Alternatively, the BS may report an index of the RZIU at which the relay zone starts and an index of a last RZIU and thus report the relay zone allocation to the scheduled RS.

Figure 18:
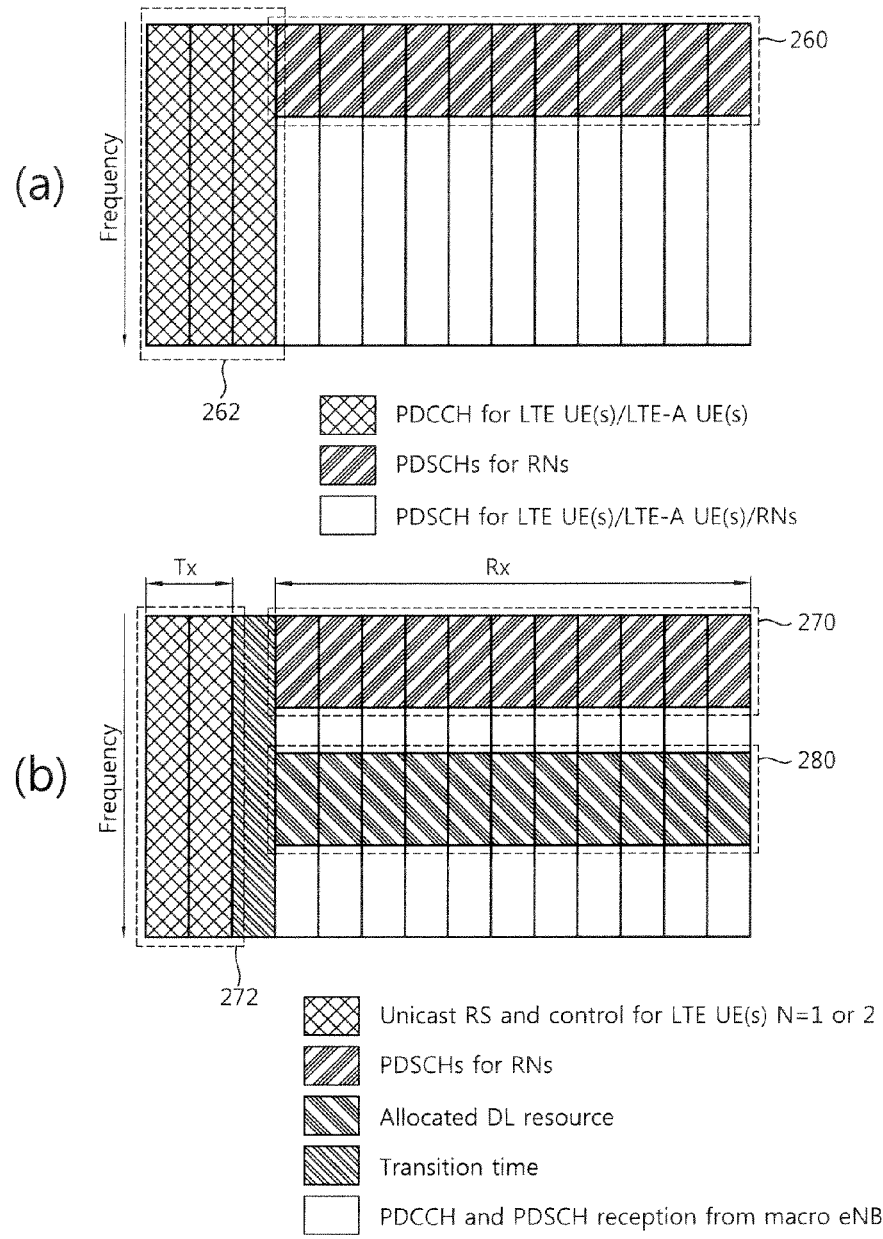
FIG. 18 shows an example of allocating a relay zone.

FIG. 18 shows an example of allocating a relay zone. A subfigure (a) shows a subframe structure from the perspective of a BS. A subfigure (b) shows a subframe structure from the perspective of an RS. In the subfigure (a) of FIG. 18, a PDCCH for a macro UE is transmitted in a control region 262. Further, in a region including $4^{th}$ through last OFDM symbols, a relay zone 260 may be allocated in a unit of RZIU. The relay zone is multiplexed by performing FDM in a PDSCH region transmitted to the macro UE. In the subfigure (b) of FIG. 18, the RS transmits a control channel such as a PDCCH to a relay UE in an access control region 272 and provides a GT in a $3^{rd}$ OFDM symbol. Then, the RS receives an R-PDCCH in a first relay zone 270 including OFDM symbols subsequent to a $4^{th}$ OFDM symbol, and receives a transport block through an R-PDSCH of a second relay zone 380 indicated by a detected R-PDCCH.

Hereinafter, a primary broadcast channel (PBCH) for an LTE-A UE will be described.

Figure 19:
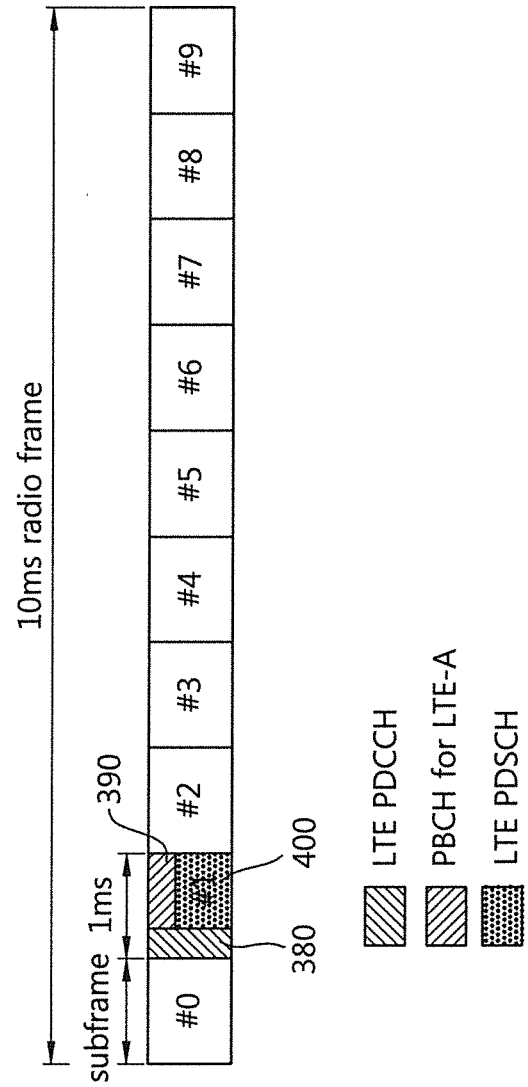
FIG. 19 shows an example of allocating a primary broadcast channel (PBCH) for an LTE-advanced (LTE-A) user equipment (UE) by performing frequency division multiplexing (FDM) on the PBCH with a physical downlink shared channel (PDSCH) for an LTE UE.

FIG. 19 shows an example of allocating a PBCH for an LTE-A UE by performing FDM on the PBCH with a PDSCH for an LTE UE. A BS may allocate a specific PRB 390 of at least one subframe 380 among a plurality of subframes included in a radio frame to the PBCH for the LTE-A. The PBCH for the LTE-A may undergo FDM with a PDSCH 400 for the LTE UE. The PBCH for the LTE-A UE may be allocated in a unit of a multiple of the radio frame. For example, the PBCH may be allocated with a time interval such as 10 ms, 20 ms, or 40 ms.

Figure 20:
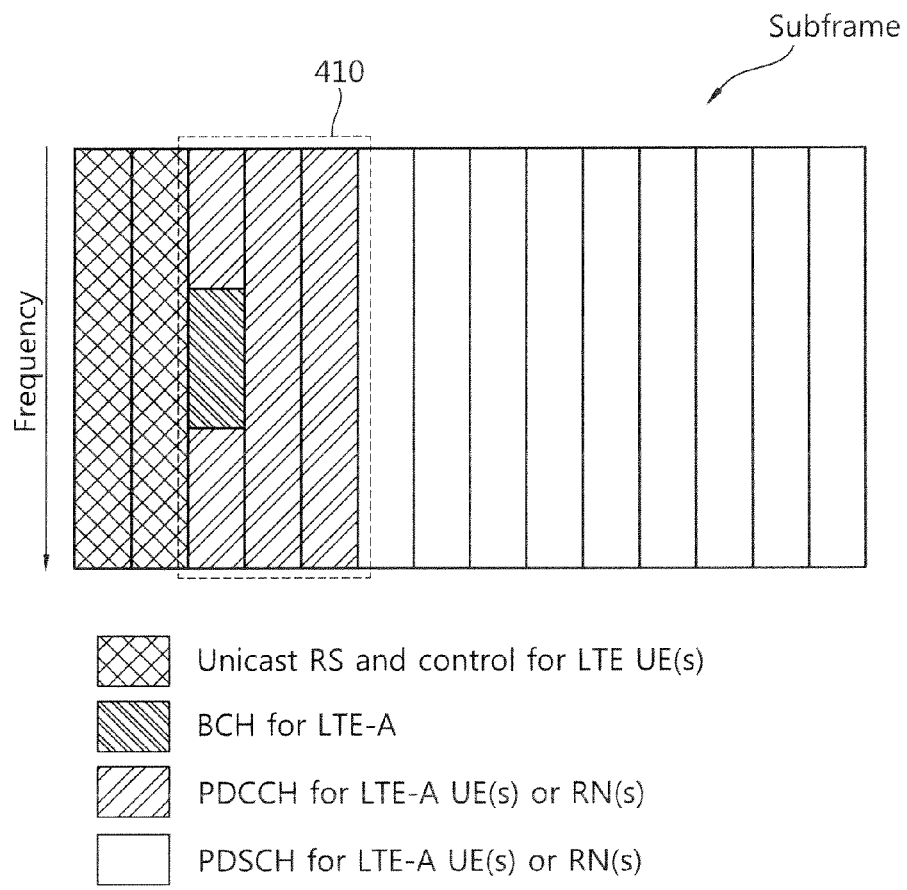
FIG. 20 shows an example of allocating a PBCH for an LTE-A UE in a control region of the LTE-A UE.

FIG. 20 shows an example of allocating a PBCH for an LTE-A UE in a control region of the LTE-A UE.

A BS may always determine at least one subframe among a plurality of subframes included in a radio frame as a subframe for the LTE-A UE, and allocate a PBCH (and/or a dynamic BCH) for the LTE-A to a specific OFDM symbol (or a specific subcarrier) included in a control region 410 for the LTE-A UE in the subframe. Preceding two (or one) OFDM symbols of a subframe 1 are allocated to a control region for an LTE UE for backward compatibility with LTE. Such a method can also apply to a PBCH for an RS.

Figure 21:
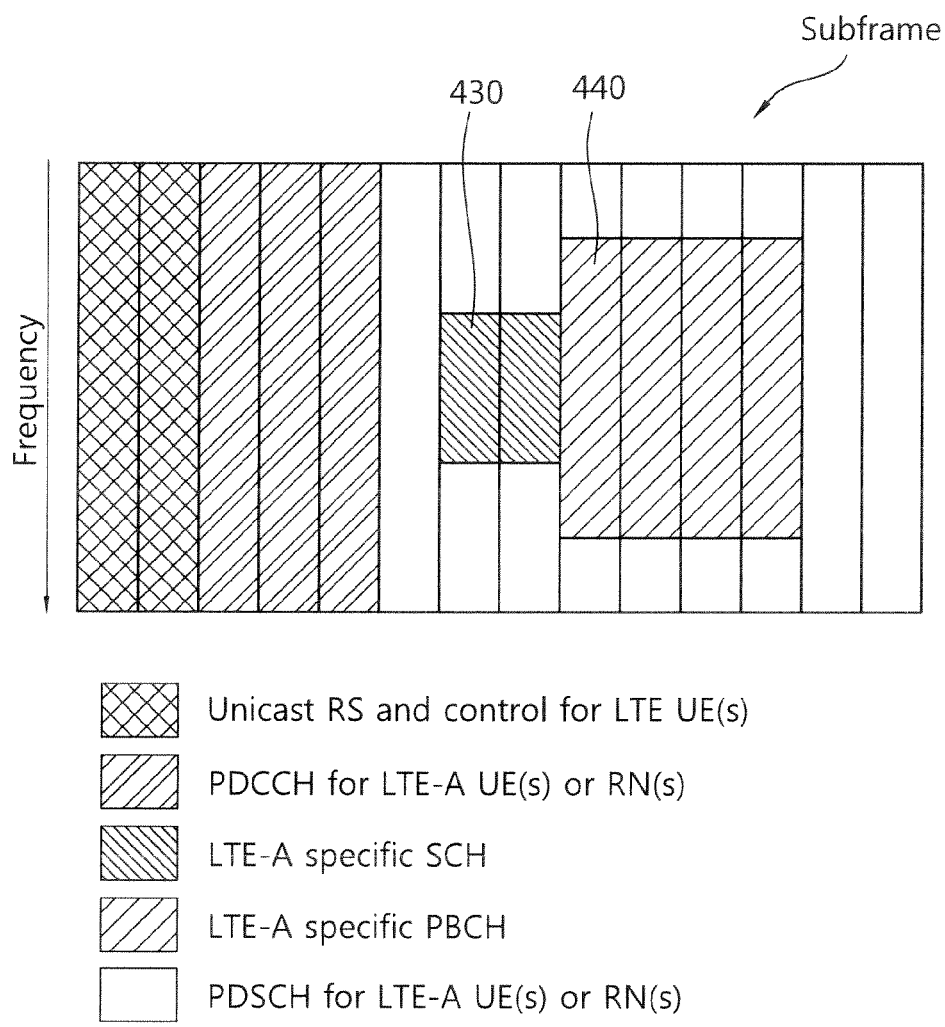
FIG. 21 shows an example of allocating a shared channel (SCH) and a PBCH for an LTE-A UE.

FIG. 21 shows an example of allocating an SCH and a PBCH for an LTE-A UE.

A BS determines at least one subframe among a plurality of subframes included in a radio frame as a subframe for an LTE-A UE, and allocates an LTE-A specific SCH 430 and an LTE-A specific PBCH 440 to a data region 420 included in the subframe. The LTE-A UE may perform an initial entry process in a cell by using the SCH 430 and the PBCH 440. Such a method can also apply to an SCH and a PBCH for an RS.

When the PBCH for the LTE-A UE is allocated by using the methods described above with reference to FIG. 19 to FIG. 21, an RNTI of system information for the LTE-A UE can be reported to the LTE-A UE by using the PBCH. Therefore, the LTE-A UE can achieve LTE-A specific dynamic BCH reception.

Figure 22:
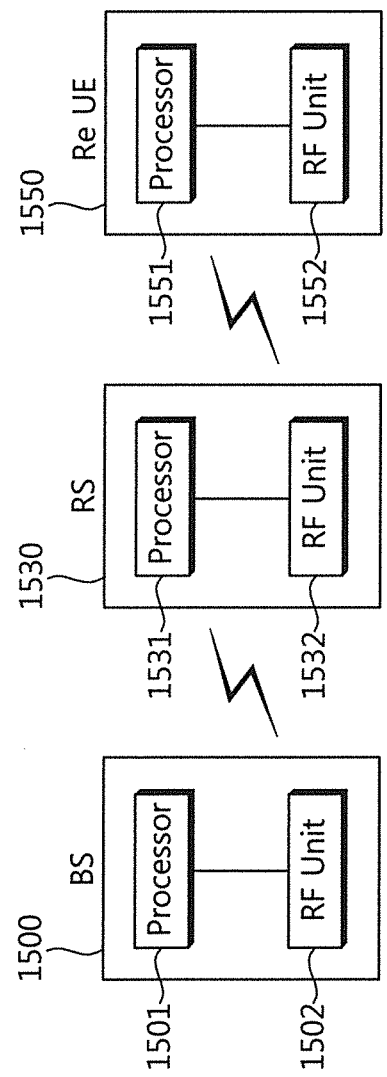
FIG. 22 is a block diagram showing a wireless communication system according to an embodiment of the present invention.

FIG. 22 is a block diagram showing a wireless communication system according to an embodiment of the present invention. A BS 1500, an RS 1530, and a UE 1550 perform communication through respective radio channels.

The BS 1500 includes a processor 1501 and an RF unit 1502. The RF unit 1502 transmits and/or receives a radio signal. The processor 1501 is coupled to the RF unit 1502, and transmits data to the RS 1530. The processor 1501 implements radio resource allocation and/or data transmission/reception with respect to a subframe according to the aforementioned embodiments.

The RS 1530 includes a processor 1531 and an RF unit 1532. The RF unit 1532 transmits and/or receives a radio signal. The processor 1531 is coupled to the RF unit 1532, and relays data received from the BS 1500 to the UE 1550. The processor 1531 implements data transmission/reception depending on a subframe allocated according to the aforementioned embodiments.

The UE 1550 includes a processor 1551 and an RF unit 1552. The RF unit 1552 transmits and/or receives a radio signal. The processor 1551 is coupled to the RF unit 1552. The processor 1551 receives data from the BS 1500 or the RS 1530, and demodulates and decodes the data.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a signal to a relay node (RN) in a wireless communication system, the method comprising:
   transmitting, to the RN, information indicating a starting orthogonal frequency division multiplexing (OFDM) symbol of a relay zone, wherein the relay zone is included in a subframe, the subframe comprising a plurality of OFDM symbols in a time domain; and
   transmitting, to the RN, a relay physical downlink control channel (R-PDCCH) in the relay zone,
   wherein the starting OFDM symbol of the relay zone is an OFDM symbol among a second OFDM symbol, a third OFDM symbol and a fourth OFDM symbol of the subframe, and
   wherein the R-PDCCH is transmitted from the fourth OFDM symbol of the subframe.

2. The method of claim 1, wherein the subframe comprises 14 OFDM symbols.

3. The method of claim 1, wherein the R-PDCCH carries downlink control information for the RN.

4. The method of claim 1, wherein the R-PDCCH is configured by a virtual resource block (VRB) unit in a frequency domain.

5. The method of claim 1, wherein the R-PDCCH is configured by a resource block group unit in a frequency domain, the resource block group unit comprising at least one virtual resource block.

6. The method of claim 5, further comprising:
transmitting a bitmap, wherein the bitmap indicates resource block groups where the R-PDCCH can be transmitted.

7. The method of claim 1, wherein the information indicating the starting OFDM symbol of the relay zone is transmitted through a higher layer signal.

8. A method of monitoring a relay physical downlink control channel (R-PDCCH) of a relay node (RN) in a wireless communication system, the method comprising:
receiving information indicating a starting orthogonal frequency division multiplexing (OFDM) symbol of a relay zone, wherein the relay zone is included in a subframe, the subframe comprising a plurality of OFDM symbols in a time domain; and
monitoring the R-PDCCH in the relay zone,
wherein the starting OFDM symbol of the relay zone is an OFDM symbol among a second OFDM symbol, a third OFDM symbol and a fourth OFDM symbol of the subframe, and
wherein the R-PDCCH is monitored from the fourth OFDM symbol of the subframe.

9. The method of claim 8, wherein the subframe comprises 14 OFDM symbols.

10. The method of claim 8, wherein the R-PDCCH carries downlink control information for the RN.

11. The method of claim 8, wherein the R-PDCCH is configured by a virtual resource block (VRB) unit in a frequency domain.

12. The method of claim 8, wherein the R-PDCCH is configured by a resource block group unit in a frequency domain, the resource block group unit comprising at least one virtual resource block.

13. The method of claim 12, further comprising:
receiving a bitmap, wherein the bitmap indicates resource block groups where the R-PDCCH can be received.

14. A relay node (RN) comprising:
a radio frequency (RF) unit for transmitting and receiving a radio signal; and
a processor connected to the RF unit,
wherein the processor receives information indicating a starting orthogonal frequency division multiplexing (OFDM) symbol of a relay zone, wherein the relay zone is included in a subframe, the subframe comprising a plurality of OFDM symbols in a time domain, and monitors the relay physical downlink control channel (R-PDCCH) in the relay zone,
wherein the starting OFDM symbol of the relay zone is an OFDM symbol among a second OFDM symbol, a third OFDM symbol and a fourth OFDM symbol of the subframe, and
wherein the R-PDCCH is monitored from the fourth OFDM symbol of the subframe.

* * * * *